J. A. PATERSON.
FACING OR MILLING MACHINE.
APPLICATION FILED JAN. 13, 1914.

1,089,258.

Patented Mar. 3, 1914.

2 SHEETS—SHEET 1.

WITNESSES:
Ewd L. Tolson
H. L. Alden

INVENTOR:
James A. Paterson,
BY Spear, Middleton, Donaldson & Spear
ATTORNEYS.

J. A. PATERSON.
FACING OR MILLING MACHINE.
APPLICATION FILED JAN. 13, 1914.

1,089,258.

Patented Mar. 3, 1914.
2 SHEETS—SHEET 2.

UNITED STATES PATENT OFFICE.

JAMES ARNOT PATERSON, OF WIDNES, ENGLAND.

FACING OR MILLING MACHINE.

1,089,258. Specification of Letters Patent. Patented Mar. 3, 1914.

Application filed January 13, 1914. Serial No. 811,865.

*To all whom it may concern:*

Be it known that I, JAMES ARNOT PATERSON, a subject of the King of Great Britain and Ireland, and resident of 88 Peelhouse Lane, Widnes, in the county of Lancaster, England, have invented certain new and useful Improvements in Facing or Milling Machines, of which the following is a specification.

This invention relates to facing or milling machines and particularly to machines for facing pipe flanges, its object being to provide a simple and efficient machine having greater productive capacity than machines at present in use.

Heretofore for pipe facing and like purposes it has been usual to mount a single tool in a tool holder carried by a rotary facing head, the said tool holder having a traversing movement away from or toward the center of said head so that when a traverse is completed, the facing operation is completed. It will be understood that the facing head has to rotate for a considerable number of revolutions before the cutting tool completes its traverse.

In accordance with my present invention, I preferably employ a plurality of cutting tools, mounted in a rotating tool holder or milling head, which are adapted to complete the facing of the pipe flange during one revolution of the facing head.

My invention comprises essentially the provision in a milling or facing machine having a continuously rotating face plate of a tool holder or milling head adapted to rotate both about its own axis and also about the face plate axis, and the arrangement, if desired, of means for adjusting the position of said tool holder or milling head relatively to said face plate so as to adapt the machine for operating upon articles of varying sizes.

Figure 1:
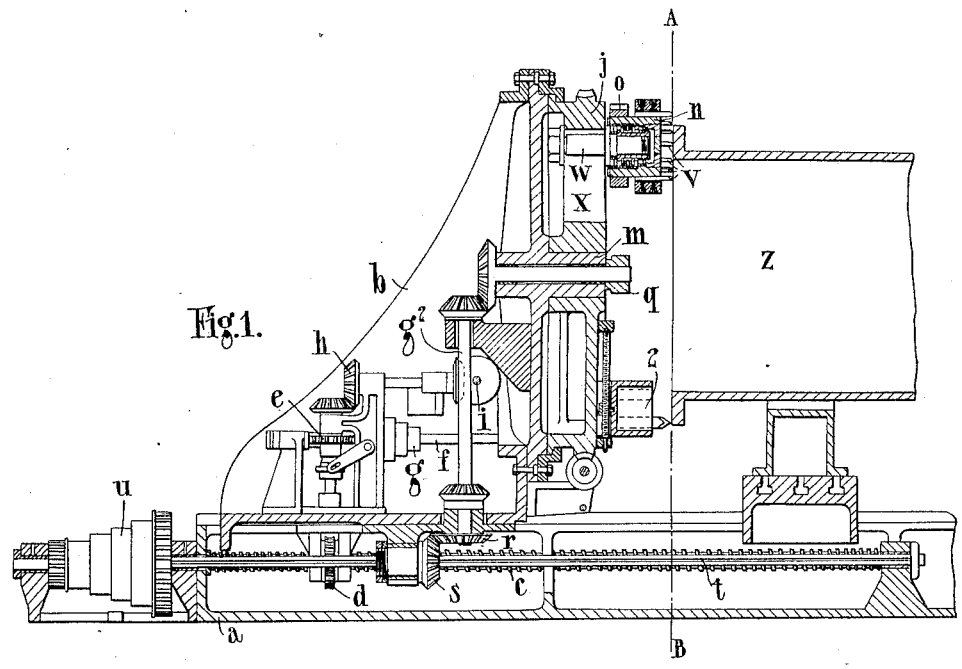
Figure 2:
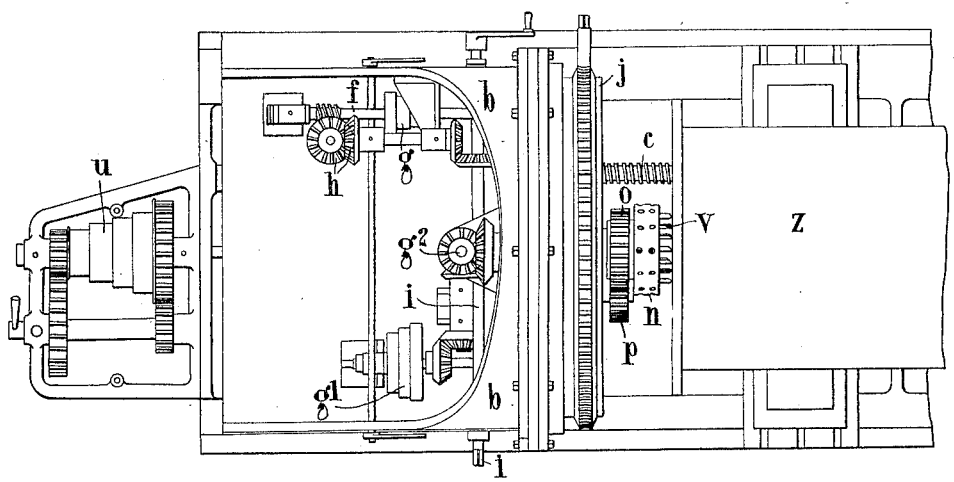
Figure 3:
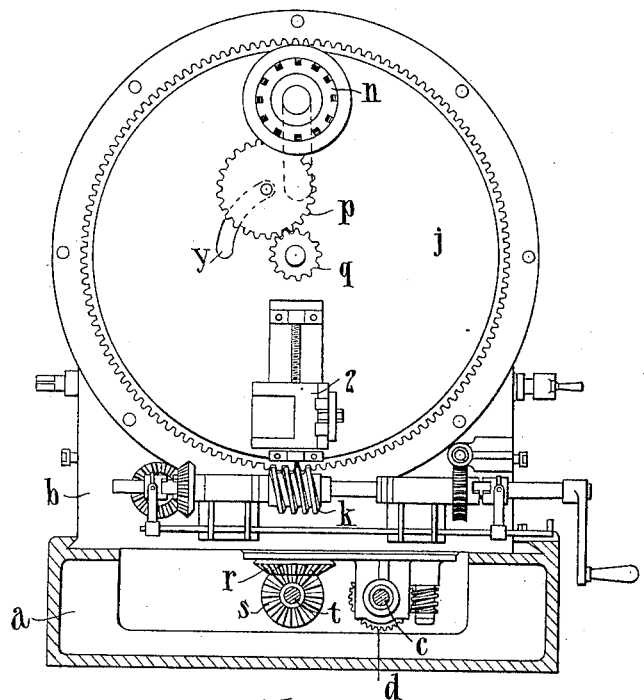

Referring to the two accompanying sheets of explanatory drawings:—Figure 1 is a sectional elevation of a milling or facing machine constructed and arranged in one convenient form in accordance with my invention. Fig. 2 is a plan view of the machine shown at Fig. 1. Fig. 3 is a sectional end elevation on the line A B and looking from right to left of Fig. 1.

The same reference letters in the three views indicate the same parts.

The machine comprises a bed or base $a$ of box form on which is mounted a headstock or carriage $b$ capable of being traversed in said bed $a$ by the screw $c$ working in a nut $d$ formed as a worm wheel (see Fig. 1) and rotated either by power from the worm wheel $e$ and worm shaft $f$ with the pulleys $g$ thereon or by hand through the bevel wheels $h$ and shaft $i$ (Fig. 2). The belt pulleys $g$ are driven from the belt pulleys $g^1$ which are themselves rotated through bevel gearing from the shaft $g^2$ from which the tool holder is actuated, as hereinafter referred to. The carriage $b$ provides a bearing for a face plate $j$ formed as a worm wheel and adapted to be rotated by a worm $k$ (see Fig. 3), the latter being capable of hand or power operation. The face plate may be driven by spur gearing in place of worm gearing. It is suitably supported by said carriage $b$ so as to have great rigidity against any twisting movement but to be free to rotate about the center support $m$. I provide a milling head or rotary tool holder $n$ upon said face plate $j$ and adapt same to be rotated about its axis by means of gear wheels $o$, $p$, $q$, the latter being rotated from the bevel pinions $r$, $s$ situated in the base of the machine, the one $s$ being feather keyed upon the shaft $t$ actuated from the pulleys $u$ through speed reduction gearing as shown. The milling head $n$ carrying the tools $v$ can be adjusted in position relatively to the axis of the face plate $j$ by varying the position of its supporting stud $w$ in the slot $x$ in said face plate. Likewsie the position of the idle pinion $p$ can be adjusted by means of the curved slot $y$ (see Fig. 3). By the aforesaid means, I am enabled to adapt the milling head to operate upon pipes as $z$ or articles of varying sizes. The milling head runs upon ball bearings upon the supporting stud $w$ as shown.

Having now described my invention what I claim as new and desire to secure by Letters Patent is:—

1. In a machine for facing by milling, in combination, a continuously rotating face plate, a rotating tool holder mounted upon said face plate but with its axis external to the axis of the latter, means for rotating said face plate and said tool holder, and means for traversing said face plate in an axial direction, as set forth.

2. In a machine for facing by milling, in combination, a continuously rotating face plate, a rotating tool holder mounted upon said face plate but with its axis external to the axis of the latter, means for adjusting said tool holder relatively to the face plate axis, means for rotating said face plate and tool holder and means for traversing the face plate in an axial direction, as set forth.

3. In a machine for facing by milling, in combination, a continuously rotating face plate with a slot therein, a rotating tool holder mounted so as to be adjustable in said slot, a gear wheel co-axial with said face plate, an adjustable carrier wheel meshing with said gear wheel and also with the tool holder, means for rotating said face plate, means for traversing the face plate in an axial direction, and means for supporting the work adjacent to the face plate, as set forth.

4. In a machine for facing by milling, in combination, a bed, a carriage mounted and traversable upon said bed, a face plate carried by said carriage, means for continuously rotating said face plate, a milling head carried upon said face plate and adjustable away from or toward the center thereof, means for rotating said milling head, and means for traversing said carriage, as set forth.

In testimony whereof I have signed my name to this specification in the presence of two subscribing witnesses.

JAMES ARNOT PATERSON.

Witnesses:
ARTHUR HUGHES,
HILDA HUGHES.

---

Copies of this patent may be obtained for five cents each, by addressing the "Commissioner of Patents, Washington, D. C."